R. FULLER.
MOTOR VEHICLE.
APPLICATION FILED JULY 27, 1908.

1,001,837.

Patented Aug. 29, 1911.

3 SHEETS—SHEET 1.

WITNESSES:
Anna M. Dow
Anna M. Mayer

INVENTOR
Rodolphus Fuller
BY
Bartlett
ATTORNEYS

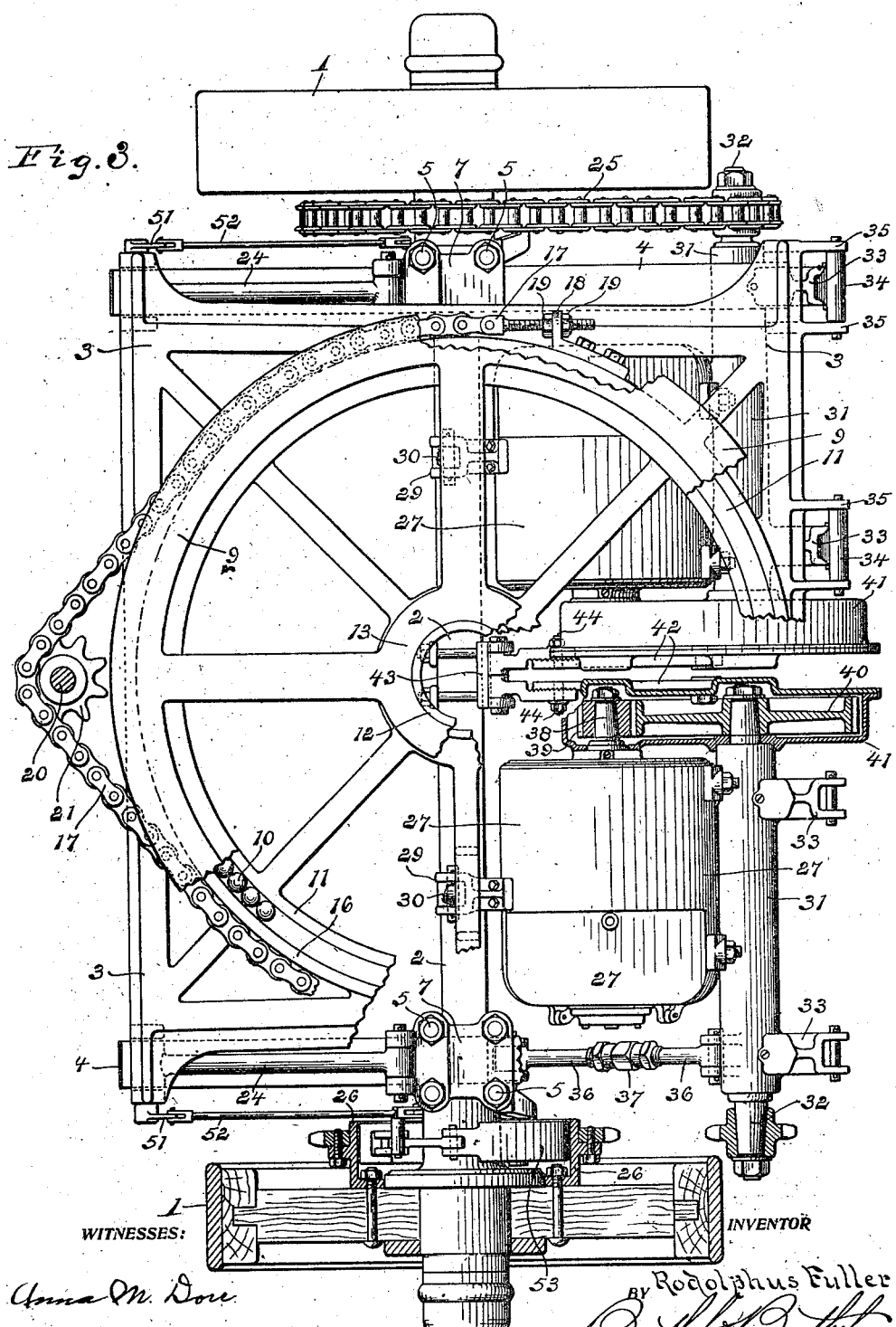

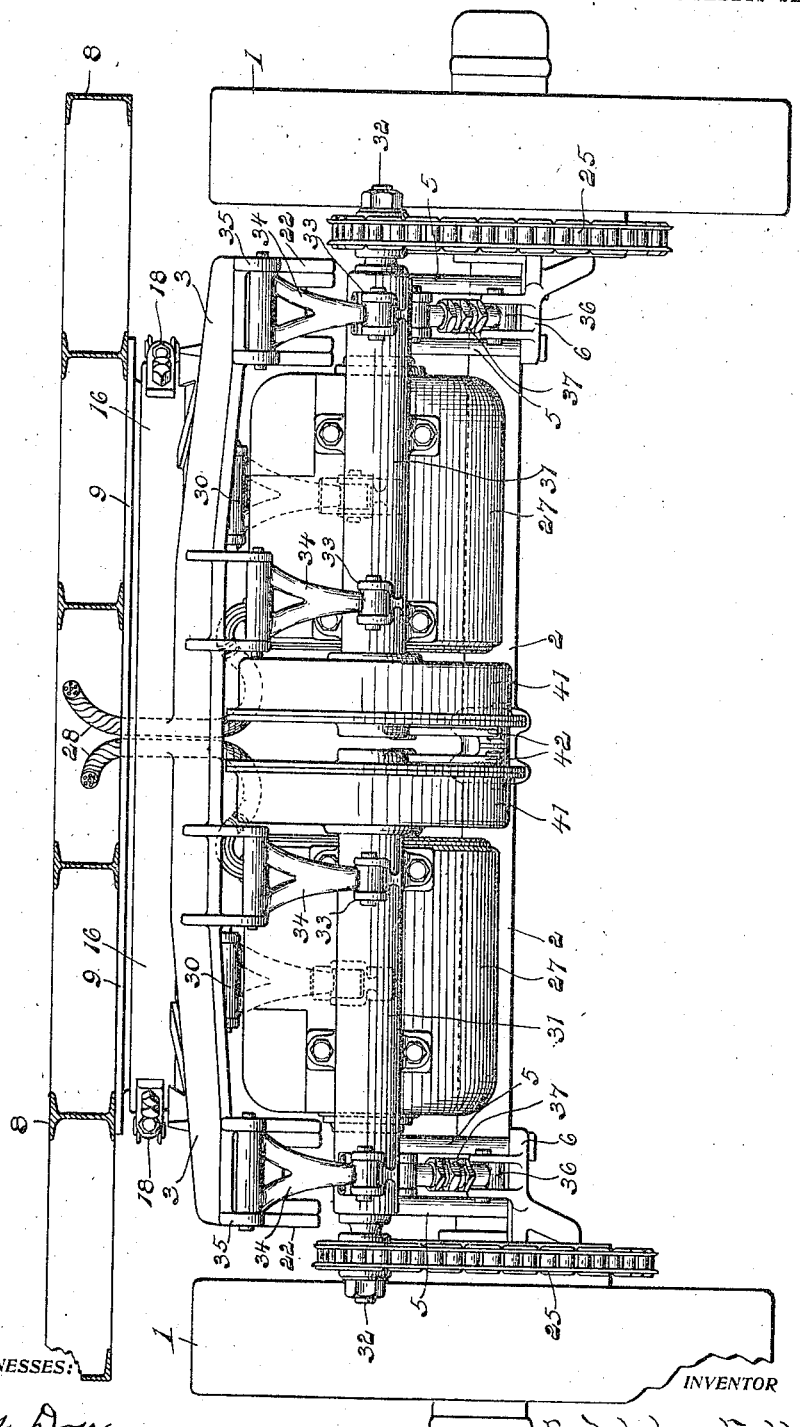

UNITED STATES PATENT OFFICE.

RODOLPHUS FULLER, OF DETROIT, MICHIGAN.

MOTOR-VEHICLE.

1,001,837.  Specification of Letters Patent.  Patented Aug. 29, 1911.

Application filed July 27, 1908. Serial No. 445,641.

*To all whom it may concern:*

Be it known that I, RODOLPHUS FULLER, a citizen of the United States of America, residing at Detroit, in the county of Wayne and State of Michigan, have invented certain new and useful Improvements in Motor-Vehicles, of which the following is a specification, reference being had therein to the accompanying drawings.

This invention relates to improvements in motor vehicles and more especially to two-wheeled trucks for self-propelled vehicles designed to carry very heavy loads, said trucks being each provided with its own means of propulsion mounted thereon independent of the vehicle frame or body.

The object of this invention is to provide a very compact and efficient construction embodying two motors, one for each wheel of the truck, and so arranged as to be independent in their operation and transmission of power, thus obviating the necessity for differential gearing, and so supported that either one or both of the motors and their transmissions may be very quickly and easily detached or lowered to accessible position for repair.

Figure 1:
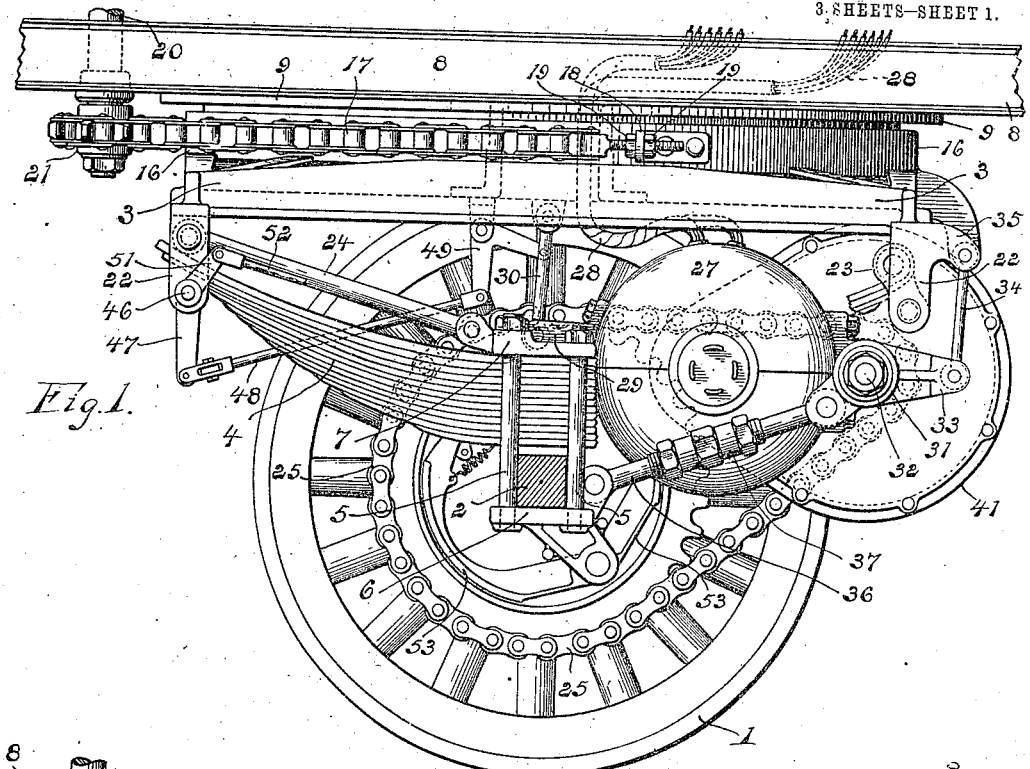
Figure 2:
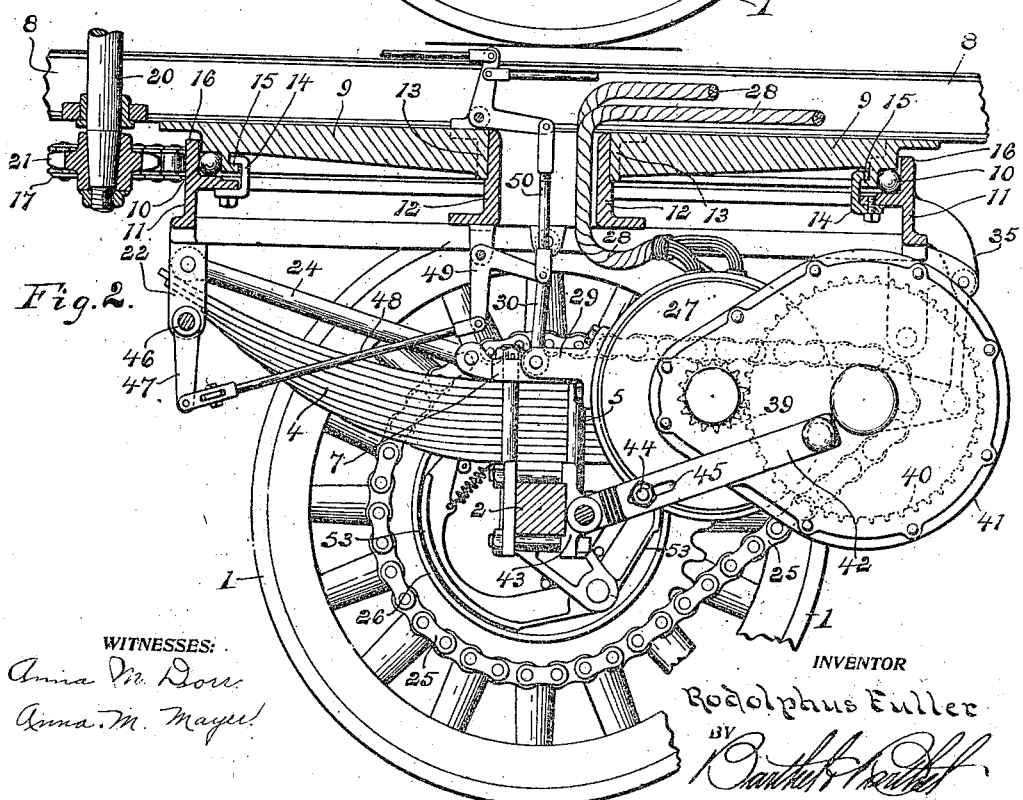

A further object of the invention is to provide a steering mechanism so constructed as to eliminate lost motion and also to provide certain other new and useful features in the construction, arrangement and combination of parts all as hereinafter more fully described and particularly pointed out in the claims, reference being had to the accompanying drawings in which:

Figure 1 is a side elevation of a truck embodying the invention, with parts broken away to show the construction; Fig. 2 is a longitudinal vertical section of the same; Fig. 3 is a plan view with parts broken away; and Fig. 4 is a rear end elevation.

As shown in the drawings, 1—1 are the driving wheels and 2 the fixed axle upon which the truck frame 3 is supported by springs 4 secured to the axle by clips consisting of vertical bolts 5 passing through lower clip plates 6 engaging the under side of the axle and upper clip plates 7 engaging the upper side of the springs.

A suitable body or load carrying frame 8 has secured to its lower side the upper member 9 of a fifth wheel or circle which member is formed with a circular track for a series of balls 10 running upon a similar track on the lower member 11 of the fifth wheel, said member 11 being cast integral with and forming a part of the truck frame. Each of these members is formed with spokes connecting its circular track with its hub portion, the tubular hub 12 of the lower member being extended and formed to fit within the bore of the hub 13 of the upper member which member is free to turn thereon. The upper member 9 of the fifth wheel is held from being lifted from but permitted to turn freely upon the balls 10, by clips 14 secured to the lower member and extending upward and over a flange 15 projecting inward from the downwardly projecting side portion of the track on the upper member. The lower member 11 of the fifth wheel is formed with an upstanding circular flange or wall 16 forming the side wall of the ball race and engaging the outer surface of this wall is a sprocket chain 17 adjustably secured at each end to ears 18 on the wall by a screw-threaded bolt extending through a hole in the ear and adjustably held therein by nuts 19 thereon at each side of the ear. A vertical steering post or shaft 20 adapted to be turned by any suitable means to turn the truck and guide the vehicle, is mounted in a suitable bearing on the body frame 8 adjacent to the forward side of the fifth wheel and the sprocket chain 17 passes over a suitable sprocket 21 on the lower end of said shaft. The chain may be quickly and easily tightened at any time to take up the lost motion and if for any reason it is desirable to permit the truck to turn freely, the steering mechanism may be quickly disconnected by disengaging the sprocket chain from its sprocket.

At each corner of the truck frame 3 are parallel downwardly extending ears 22 between which the ends of the springs 4 extend, said springs being attached to said ears at their rear ends by the usual links 23, and to hold the frame in position upon the springs but at the same time permit them to flex freely, distance rods 24 are pivoted between the ears 22 at the forward side of the frame at one end and at their opposite ends, between ears formed integral with the clip plates 7. The forward ends of the springs extend between the ears to which the distance rods are pivoted and engage the lower side of the eyes in the ends of said rods through which their pivot bolts extend sliding freely thereon between the ears.

Power is transmitted to the driving wheels 1 to propel the vehicle by means of sprocket chains 25, one for each wheel, each engaging a large sprocket secured to the brake-drum 26 which in turn is bolted securely to the spokes of the wheel. Two electric motors 27 are suspended beneath the truck frame and the electric current is supplied to each of these motors through cables 28 passing upward through the tubular hub of the truck frame to any suitable source of electric energy (not shown) mounted upon the body frame of the vehicle. Each motor is supported entirely independent of the other and suitable power transmission mechanism is provided for each motor to transmit its motion to the wheel at its side. Each motor is supported above and at the rear side of the axle 2 by securing to its casing a forwardly extending arm 29 and a link hanger 30 pivotally attached to this arm at one end and at its upper end to a suitable ear on the truck frame forms a hanger to pivotally suspend the motor from the frame at one side. Bolted to the opposite or rear side of each motor casing is a sleeve 31 for a counter-shaft 32 therein, which is provided on its outer end with a sprocket engaged by the chain 25, and formed integral with this sleeve are two rearwardly extending arms 33 to the outer ends of which are pivotally attached link hangers 34 pivoted at their upper ends to suitable rearwardly extending ears 35 on the truck frame. Each motor is thus supported by the three links 30 and 34 and to prevent these links from swinging and to hold the motor rigidly in position a distance rod 36 is pivoted at one end between suitable ears on the sleeve 31 and at its opposite end between ears on the lower clip-plate 6. These distance rods 36 are made adjustable in length by forming each in two parts connected by an internally screw-threaded sleeve 37 held in adjusted position by lock nuts in the usual manner.

Upon the projecting end of the motor shaft 38 is secured a pinion 39 in mesh with a gear 40 upon the counter-shaft 32 and a suitable gear-casing 41 is secured to the motor casing and the end of the sleeve 31 to inclose said gears. Each motor is held at its inner end from swinging upon its hangers by a distance bar 42 made in two parts, one part being provided with an eye to receive an eye-bolt passing through suitable ears on a clip member 43 secured to the axle 2. The other member of the distance bar is pivotally attached at its rear end to the gear-casing 41 and the contact faces of the adjacent ends of said members are provided with teeth or corrugations adapted to interlock when the ends are drawn together by the locking bolt 44 secured to the end of one of said members and extending through a slot 45 in the end of the other member. The length of said distance bars may, therefore, be adjusted by loosening the bolts 44 sufficiently to permit the disengagement of the corrugations and the adjustment of one member upon the other. In this construction each motor with its transmission mechanism is supported entirely independent of the other motor and its transmission mechanism and either or both motors with their transmissions may be quickly and easily lowered to make them accessible for repair by simply removing the pivot bolts of the several hangers. An efficient chain adjustment is also secured in this construction as by adjusting the lengths of the distance rods 36 and distance bars 42, the motor and its counter-shaft will be swung toward or from the axle upon the hangers.

The downwardly extending ears 22 at the forward side of the truck frame furnish at their lower ends suitable bearings for a rock-shaft 46. Intermediate its ends this rock-shaft is provided with a downwardly extending arm 47, to the lower end of which a connecting rod 48 is attached. The opposite end of this connecting rod is pivotally attached to one arm of the bell-crank 49 pivoted between ears extending downward from the lower end of the hub portion of the truck frame. To the other arm of the bell-crank is attached a second connecting rod 50 extending upward through the tubular hub of the fifth wheel of the truck. Any suitable connection may be provided to operate this connecting rod 50 from any remote part of the vehicle. On each end of the rock-shaft 46 is an arm 51 and a connecting rod 52 attached to said arm transmits motion therefrom to any suitable brake mechanism, (not shown), for forcing the brake shoes 53 into contact with the inner face of the brake drum 26.

The truck shown in the drawings is the front or steering truck of the vehicle but it is proposed to make the rear truck substantially the same except that the circle or fifth wheel will be omitted and the truck frame secured rigidly to the body frame.

Having thus fully described my invention what I claim is:

1. In a truck for motor vehicles, the combination of a fixed axle, driving wheels on said axle, a truck frame, springs on the axle supporting the truck frame, a motor for each wheel, a casing for each motor, a plurality of hangers for each casing pivotally attached to the frame at their upper ends, two of said hangers being pivotally connected at their lower ends to each casing at one side thereof and another of said hangers being pivotally connected at its lower end to the casing of each motor at the opposite side of said casing, said hangers forming a three-point suspension for each motor, a counter-shaft carried by each motor casing, gears connecting said shaft and motor, sprockets on said shafts and vehicle wheels, and sprocket chains engaging said sprockets.

2. In a truck for motor vehicles, the combination of a fixed axle, driving wheels on said axle, a truck frame, springs on the axle supporting the truck frame, a motor for each wheel, each motor being independent of the other, a casing for each motor, a sleeve on each casing at the outer side thereof, forwardly and rearwardly extending arms on each casing, hangers pivotally attached to the frame and to said arms to suspend the casing from the frame and maintain the same in a horizontal plane, a shaft in each sleeve, gears on the shafts and motors to transmit motion from the motors to the shafts, a sprocket wheel on the end of each shaft adjacent to each wheel, a sprocket on each wheel, sprocket chains engaging said sprockets, and distance members at each end of each motor casing pivotally connected thereto and to the axle to hold each motor and shaft parallel with the axle.

3. In a truck for motor vehicles, the combination of driving wheels, a fixed axle for said wheels, semi-elliptic springs secured to said axle, a truck frame, links attaching one end of said springs to the frame, the opposite ends of said springs engaging said frame and permitting a free relative movement, distance rods pivoted at one end to the truck frame near the free ends of said springs and at their opposite ends to the rigid portion of said springs, two independent motors arranged in longitudinal alinement, casings for said motors, hangers pivoted to the truck frame to suspend said motor casings above and at one side of the axle, a counter-shaft supported by each motor casing at one side thereof, gears on the adjacent ends of the motor shafts and counter-shafts, gear casings for said gears secured to the adjacent ends of the motor casings, a sprocket and chain connection between the outer end of each counter-shaft and the adjacent driving wheel, a radius member at the outer end of each motor pivotally attached to the axle at one end and to one of said casings at its opposite end, distance bars pivotally attached at one end to the gear casings and each formed of two parts provided with interlocking projections at their adjacent ends and one part pivotally attached at its opposite end to the axle, and means for securing the said interlocking ends of the parts together.

In testimony whereof I affix my signature in presence of two witnesses.

RODOLPHUS FULLER.

Witnesses:
 OTTO F. BARTHEL,
 ANNA M. DORR.